(12) United States Patent
Pinchin et al.

(10) Patent No.: US 12,064,729 B2
(45) Date of Patent: Aug. 20, 2024

(54) DEVICE FOR PROCESSING WATER, SYSTEM, AND METHODS

(71) Applicant: National Oilwell Varco Norway AS, Kristiansand S (NO)

(72) Inventors: David Pinchin, Hundvåg (NO); Karl Erik B. Selvig, Sandnes (NO)

(73) Assignee: Grant Prideco, Inc., Houston, TX (US)

( * ) Notice: Subject to any disclaimer, the term of this patent is extended or adjusted under 35 U.S.C. 154(b) by 0 days.

(21) Appl. No.: 17/040,158

(22) PCT Filed: Mar. 28, 2019

(86) PCT No.: PCT/NO2019/050065
§ 371 (c)(1),
(2) Date: Sep. 22, 2020

(87) PCT Pub. No.: WO2019/190330
PCT Pub. Date: Oct. 3, 2019

(65) Prior Publication Data
US 2021/0008500 A1    Jan. 14, 2021

(30) Foreign Application Priority Data
Mar. 28, 2018 (EP) .................................... 18164582

(51) Int. Cl.
*B01D 61/18*    (2006.01)
*B01D 63/06*    (2006.01)
(Continued)

(52) U.S. Cl.
CPC ........... *B01D 63/061* (2013.01); *B01D 61/18* (2013.01); *C02F 1/444* (2013.01);
(Continued)

(58) Field of Classification Search
CPC .. B01D 63/061; B01D 61/18; B01D 2313/04; B01D 2313/105; B01D 2313/13;
(Continued)

(56) References Cited

U.S. PATENT DOCUMENTS

| | | | | |
|---|---|---|---|---|
| 4,038,191 A | * | 7/1977 | Davis ..................... | B01D 63/02 239/566 |
| 4,640,773 A | * | 2/1987 | Nishida .................. | B01D 53/22 210/321.89 |

(Continued)

FOREIGN PATENT DOCUMENTS

| | | |
|---|---|---|
| EP | 1743690 A1 | 1/2007 |
| EP | 2749346 A1 | 7/2014 |

OTHER PUBLICATIONS

International Search Report for PCT/NO2019/050065 dated Jul. 24, 2019 (3 pages).

(Continued)

*Primary Examiner* — Pranav N Patel
(74) *Attorney, Agent, or Firm* — Conley Rose, P.C.

(57) ABSTRACT

Apparatus and methods for use in water processing include housing sections that house in their interiors water treating membranes, the respective interiors being separate from one another. A distributor chamber for containing a flow of water to be treated conveys water to be treated from a feed inlet and distributes the water to be treated into the interiors of the housing sections. A collector chamber for collecting treated water from the interiors of the housing sections is provided to communicate a merged flow of the treated water to an extraction outlet. The device may be employed in subsea systems or in a topside water processing system.

25 Claims, 6 Drawing Sheets

(51) Int. Cl.
  *C02F 1/44* (2023.01)
  *C02F 103/08* (2006.01)
(52) U.S. Cl.
  CPC .... *B01D 2313/04* (2013.01); *B01D 2313/105* (2013.01); *B01D 2313/13* (2013.01); *B01D 2313/54* (2013.01); *B01D 2317/04* (2013.01); *B01D 2317/06* (2013.01); *C02F 2103/08* (2013.01); *C02F 2303/14* (2013.01)
(58) Field of Classification Search
  CPC ............ B01D 2313/54; B01D 2317/04; B01D 2317/06; B01D 63/06; B01D 2313/125; B01D 2313/21; B01D 63/12; B01D 63/046; B01D 61/08; B01D 63/02; B01D 35/303; B01D 2313/12; B01D 2313/20; B01D 2313/44; B01D 2313/10; B01D 2319/04; B01D 29/52; B01D 63/10; B01D 2201/4023; B01D 61/145; B01D 61/147; B01D 2313/08; B01D 61/027; B01D 63/04; B01D 69/04; B01D 2201/043; B01D 2313/32; B01D 61/14; B01D 61/02; C02F 1/444; C02F 2103/08; C02F 2303/14; C02F 1/441; C02F 1/442
  See application file for complete search history.

(56) References Cited

U.S. PATENT DOCUMENTS

| | | |
|---|---|---|
| 4,876,012 A | 10/1989 | Kopp |
| 2012/0074053 A1* | 3/2012 | Collignon ............ B01D 63/046 210/209 |
| 2013/0206672 A1 | 8/2013 | Harness |
| 2014/0339169 A1* | 11/2014 | Zeren ...................... C02F 1/441 210/170.11 |
| 2015/0068970 A1* | 3/2015 | Cho ........................ B01D 63/12 210/323.1 |
| 2015/0273365 A1* | 10/2015 | Laverdiere ............ F16L 19/025 285/124.5 |
| 2016/0185626 A1 | 6/2016 | Glynn |
| 2017/0151533 A1 | 6/2017 | Biltoft |
| 2017/0349455 A1* | 12/2017 | Katz ...................... B01D 63/06 |
| 2018/0251386 A1* | 9/2018 | Wang ...................... E21B 43/40 |

OTHER PUBLICATIONS

Written Opinion for PCT/NO2019/050065 dated Jul. 24, 2019 (5 pages).
Extended European Search Report for EP 18164582.1 dated Sep. 21, 2018 (6 pages).
EP Exam Report dated Nov. 12, 2021, for Application No. EP 18164582.1.

* cited by examiner

-PRIOR ART-

DEVICE FOR PROCESSING WATER, SYSTEM, AND METHODS

CROSS REFERENCE TO RELATED APPLICATIONS

This application is a U.S.C. § 371 national stage application of PCT/NO2019/050065 filed Mar. 28, 2019 and entitled "Device for Processing Water, System, and Methods", which claims priority to European Patent Application No. 18164582.1 filed Mar. 28, 2018, each of which is incorporated herein by reference in their entirety for all purposes.

STATEMENT REGARDING FEDERALLY SPONSORED RESEARCH OR DEVELOPMENT

Not Applicable

FIELD OF THE DISCLOSURE

The present disclosure relates to the field of water processing and related equipment, in particular for treating water such as by filtration. In particular embodiments, a device may be employed in a system for processing seawater, to produce treated water for injection into wellbores.

BACKGROUND

In water processing, water may be processed and treated in various ways to bring it into suitable condition for end use. The water may need several steps of processing before a desired condition of the water is obtained and in doing so a flow of water may need to be passed through various devices having different functions to process the water in the necessary way.

Utilising the sea as a source of water and treating seawater to produce an end product can be attractive in some contexts. Solutions for producing treated water at the seabed have also been devised. Treated water that can be injected into a wellbore, produced subsea from seawater is of particular interest herein.

Equipment for subsea water treatment and injection into wellbores can include that marketed by National Oilwell Varco under the trade name SWIT™ Technology.

The treatment applied to the water in a water processing process may include: chemical treatment, disinfection, suspended solids removal and dissolved solids (ionic) removal such as desalination. The equipment that addresses removal of suspended and dissolved solids may include permeable or semi-permeable membranes, e.g. microfiltration (MF), or ultrafiltration (UF),) membranes. Such membranes may for example be configured as: a) Dead-end filters; where the complete feed flow is forced through the membrane and the filtered matter e.g. particles is accumulated on the surface or, b) Cross flow; where a turbulent feed flow over the membrane surface is created and the resultant reject flow and permeate flow have a 90 degree angle.

Such membranes are typically contained inside a cylindrical casing. In use, water being treated may be urged into contact with the membrane inside the casing, for processing the water. For subsea operation, the water being processed in the system may have a pressure lower than the surroundings. Indeed, pumps may be employed in the system that may draw the seawater through filter membrane elements on the suction side of the pump.

For example, in equipment for treating water for injection into wellbores, such as the SWIT™ Technology, water intake from the sea is first treated for disinfection, electrolytic treatment then filtered, e.g. subjected to micro filtration or ultra filtration using filter membranes, to remove solids particles. After filtering, the water may then be pumped through to a further stage of treatment. The earlier filtration stage can be effective for pre-conditioning the water before it reaches the further stage. If the micro filtration and/or ultra filtration is not performed, downstream performance can be deteriorated and/or equipment may degrade quicker.

In this system, the pump is beneficially operated upstream of the further treatment stage which requires high energy and reliable pressure delivery in the water supplied from the pump. However, for process simplicity, the pump can be located downstream of the filtration stage. The pressure in the water passing through filter elements on the suction side of the pump can be a good deal lower than the ambient pressure of the sea at the location of the equipment on the seabed. The water filtration operates at "negative" pressure relative to ambient surroundings. While there are benefits in the general arrangement of this system, operating at "negative" pressure conditions can provide challenges.

A high throughput of water may be required to supply a wellbore or multiple wellbores with treated water. To this end, multiple casings each containing groups of membranes may be connected together in parallel. Suitable casings can be sourced pre-configured as "ready to use" elements containing the membranes, interior flow channels, and end fittings. Conventionally, the preconfigured element casings are connected to common pipes (headers) through individual branch pipes and fittings that mate with the respective end fittings of each element casing. If greater throughput is needed, typically further elements are simply added to the "bank" of element casings and connected in the same way. A conventional prior art membrane casing is depicted in FIG. 8, where a central conduit is provided for flow out of the end of the casing. The conduit is fitted on the inside of the wall of the casing with various connections and O-ring seals used between parts that are connected for sealing off the interior where the membranes are housed.

Although the conventional solution has been found to work well, the inventors have noted that it is dependent upon the integrity of the various connection/sealing points involved in joining up the casings to the piping headers and the elements inside the casings.

The elements in duty on the suction side of a pump (e.g. for filtration on a subsea application such as mentioned above) can incur a pressure loss across the membrane and hence a "negative" pressure can arise on the inside of the casing relative to the ambient external pressure. In the "negative pressure" situation therefore, an accidental leak/inflow from the sea into the processing equipment can have detrimental consequences for the success of the treatment operation, because the exact same water that the system is designed to treat "re-enters" back into the system at the inflow, and the desired end product may not be achieved. Any such leak can be detrimental for the water quality sought downstream. Conventional equipment for containing filtration membranes and connecting filtration casings can therefore be poorly suited, risk inconvenient breakdowns, and carry an unacceptable leak and end product quality risk, which can be exacerbated in subsea water treatment systems.

The conventional configuration of casings can place high requirements for servicing and demands upon the operator to ensure that the connections and bank of interconnected elements work well. Such requirements can increase however if the throughput requirement is greater, and in the subsea environment this is not trivial, as equipment must be robust, water tight, and fit for purpose. Servicing can be costly and may require components to be recovered from the seabed and replaced. From time to time, access and replacement of filtration membranes may also be required, and there can be inconvenience associated with this including the undoing and doing up of multiple connections and fittings.

SUMMARY OF THE DISCLOSURE

There can be a need for improved arrangements that reduce operating and/or service requirements and demands, such as those mentioned above. Disclosed herein are apparatus and methods aimed to obviate or at least mitigate one or more drawbacks or challenges associated with the prior art.

According to a first aspect of the disclosure there is provided a device for water processing, the device comprising: housing sections for housing membranes for treating water in the interiors of the housing sections, wherein the interiors of the sections are separate from one another; a feed inlet for supplying the device with water to be treated; an extraction outlet for extracting treated water from the device; a distributor chamber for containing a flow of water to be treated from the feed inlet and distributing the water to be treated into the interiors of the housing sections; and a collector chamber for collecting treated water from the interiors of the housing sections and communicating a merged flow of the treated water to the extraction outlet.

The device may be immersed subsea, e.g. at or near the seabed.

The device may further comprise walling or casing configured or shaped to form one or more of the housing sections; distributor chamber; and the collector chamber. The walling or casing may include at least one bonded joint. At least one of the housing sections may typically be joined to a section of the walling or casing by at least one bonded joint. This may be convenient if housings for membranes may be available as modules.

The bonded joint may comprise a resin bond, e.g. epoxy bond. In general, the bonded joint may comprise a bond using any suitable bonding material. The bonding material may be selected according to the materials of contact surfaces which may be contacted and bonded by the bonding material. The walling or casing, or parts thereof to be joined by bonding, may comprise plastics material. The collector chamber and/or distributor chamber and the housing section can thus together form a unitary casing and/or walling between the feed inlet and the extraction outlet. The device may therefore have a permanent structure or casing/walling. In some embodiments, no fasteners or seal rings or the like are required to connect respective housing sections in fluid communicating manner to the collector chamber and/or the distributor chamber. The structure or casing and/or walling may be one piece moulded also without requiring any bonding and/or bonded joints. In various examples, however the casing and/or walling may have a removable cover provided for access to the interior(s) of the housing sections and/or the distributor chamber or collector chamber. The cover may advantageously allow access therethrough to the interiors of multiple housing sections of the device. The device may in this way better withstand and/or reduce or eliminate connection related leak risks for operation of the device. This may especially be so under "negative pressure" when the pressure in fluid which is to be or has been treated by filtration in the membranes is lower than the pressure of ambient seawater at, adjacent and/or in contact with the exterior of the casing and/or housing of the device.

The walling or casing may thus include either or both of: a cover which is removable for accessing at least one of the housing sections through an interior of the collector chamber; and a cover which is removable for accessing at least one of the housing sections through an interior of the distributor chamber. The cover may be a lid. The cover may fit sealably onto a circumferential lip of walling or casing. The walling or casing or the lid may be provided with a seal, e.g. elastomer ring or gasket or the like, arranged to be engaged for sealing when the lid is fitted and secured onto the lip in use.

The housing sections may comprise elongate tubulars having first and second ends.

The extraction outlet may be arranged to extract the treated fluid from the collector chamber in a radial direction with respect to a longitudinal axis of the housing sections.

The feed inlet may be arranged to enter the water to be treated into the distributor chamber in a radial direction with respect to a longitudinal axis of the housing sections.

Either or both of the feed inlet and extraction outlet may be arranged in a section of walling or casing radially offset from the housing sections.

The distributor chamber may have a cross-sectional extent which tapers away from the feed inlet. The collector chamber may have a cross-sectional extent which tapers away from the extraction outlet. This may facilitate inflow/outflow flow or distribution profiles particularly where there may be a large number of housing sections, e.g. five or more, and some of the housings are distant from inlet or outlet as the case may be.

Typically, the housing sections may comprise tubular sections of casing, e.g. tubulars, the tubular sections having first and second ends. The tubular sections may preferably be arranged in parallel and spaced apart relationship. The tubular sections may typically be cylinders. In use, they may typically be arranged vertically, e.g. supported in a frame on the seabed. The housing sections may be spaced apart by an aperture therebetween such that in use subsea, seawater in the exterior environment surrounding the sections may occupy the aperture and contact the exterior surfaces of the sections.

The device may further comprise a first ends section of walling or casing which may form a structure encompassing the first ends of the tubulars to provide the distributor chamber, the distributor chamber reaching across the first ends of the tubulars.

The device may further comprise a first ends section of walling or casing which may form a structure to provide the distributor chamber, the distributor chamber reaching across the first ends of the tubulars, wherein the first ends section may be connected to the first ends of the tubulars by joins formed by annular joins formed on the outsides of the respective tubulars at or near the first ends of the tubulars.

The first ends section of walling or casing may include at least one sleeve or opening adapted to fit around an outer diameter of at least one of the tubulars, and a first end or near-first end portion of the tubular may be received in the sleeve and bonded thereto, for joining the first ends section of walling or casing to the tubular.

The device may further comprise a second ends section of walling or casing which may form a structure encompassing the second ends of the tubulars to provide the collector chamber, the collector chamber reaching across the second ends of the tubulars.

The device may further comprise a second ends section of walling or casing which forms a structure to provide the collector chamber, the collector chamber reaching across the second ends of the tubulars, wherein the second ends section may be connected to the second ends of the tubulars by annular joins formed on the outsides of the respective tubulars at or near the second ends of the tubulars.

The second ends section of walling or casing may include at least one sleeve adapted to fit around an outer diameter of at least one of the tubulars, and an second end or near-second end portion of the tubular may be received in the sleeve and bonded thereto, for joining the second ends section of walling or casing to the tubular.

The collector chamber, for example, can have a channel for flow of treated water, in particular radially with respect to the long axis of the housing sections, toward the extraction outlet, at least one cross section of the channel through which the fluid may flow having an area which is greater than the area of at least one cross section, e.g. greater than the average area of cross sections, through which the fluid may flow along the interior of the housing sections between the membranes and the collector chamber. The channel and/or collector chamber may have an interior space of "depth" extent along the longitudinal axis beyond an end of one or more of the housing sections, and/or a width extent, that is at least 50% or greater than 50% of the diameter of the cross section or average diameters of cross sections through which fluid may flow along the interior of the housing sections between the membranes and the collector chamber. For instance, the depth extent and/or width extent may be greater or equal to the diameter of the of the diameter of the cross section or average diameters of cross sections through which fluid may flow along the interior of the housing sections between the membranes and the collector chamber, or anything between the 50% (e.g. average) diameter and the full (e.g. average) diameter. In this way, the collector chamber can provide a large and relatively open region for water to flow. This can facilitate flow distribution and reduce energy consumption and requirements of downstream pumps which facilitate lowering the operational pressure in the device to below the ambient seawater pressure adjacent to the device i.e. "negative" pressure conditions. With regards to distribution, the arrangement may better allow water to be treated to travel through the device, with less pressure drop.

The distributor chamber may be similarly configured and may benefit from similar advantages. Thus, the distribution chamber, for example, can have a channel for flow of water to be treated, in particular radially with respect to the long axis of the housing sections, away from the feed inlet, at least one cross section of the channel through which the fluid may flow having an area which is greater than the area of at least one cross section, e.g. greater than the average area of cross sections, through which the fluid may flow along the interior of the housing sections between the distributor chamber and the membranes. The channel and/or distribution chamber may have a "depth" extent along the longitudinal axis beyond an end of one or more of the housing sections, and/or a width extent, that is at least greater than 50% of the diameter of the cross section or average diameters of cross sections through which fluid may flow along the interior of the housing sections between the distributor chamber and the membranes. For instance the depth and/width extent may be greater that or equal to the diameter of the of the diameter of the cross section or average diameters of cross sections through which fluid may flow along the interior of the housing sections between the distributor chamber and the membranes, or anything between the 50% (e.g. average) diameter and the full (e.g. average) diameter.

According to a second aspect of the disclosure, there is provided a method of constructing the device according to the first aspect.

According to a third aspect of the disclosure, there is provided a method of constructing the device according to the embodiments of the first aspect in which the housing sections may comprise tubular sections of casing, the method comprising the steps of: providing elongate tubular sections of casing for housing membranes therein; and either or both of: bonding a first ends section of casing or walling to the first ends of the tubular sections to obtain a structure for providing the distributor chamber; and bonding a second ends section of casing or walling to the second ends of the tubular sections to obtain a structure for providing the collector chamber.

The method may include inserting the first end of at least one of the tubular sections into a sleeve, and bonding an outer surface of the tubular section at or near the first end of the tubular section to at least one surface of the sleeve.

The method may include inserting the second end of at least one of the tubular sections into a sleeve, and bonding an outer surface of the tubular section at or near the second end of the tubular section to at least one surface of the sleeve.

According to a fourth aspect of the disclosure, there is provided a method of treating water, the method comprising the steps of: providing the device according to the first aspect, in a system to produce treated water; operating the system to treat the water, feeding the water to be treated through the feed inlet into the distributor chamber and from the distributor chamber into the housing sections, using the membranes to treat respective water streams in the respective housing sections; and further operating the system to extract the treated water from the cylindrical sections through the extraction outlet from the collector chamber.

The device may be provided at or near the seabed, under sea.

The water to be treated may typically comprise seawater, typically from a vicinity in the surrounding environment. The step of providing the device may comprise immersing the device under water.

The housing sections may comprise tubular sections of casing or walling, outer surfaces of which may be in contact with and surrounded by the sea. The tubular sections may comprise pressure vessels in which the interior of the casings may be isolated from pressure applied from the sea in the surrounding environment against the outer surfaces.

The treated water may comprise injection water for injection into at least one wellbore.

The device may be applied to treat the water by using the membranes to remove solids from the water.

According to a fifth aspect of the disclosure, there is provided a system or apparatus for treating seawater subsea, the system comprising: a device in accordance with the first aspect; and having at least one pump wherein the suction side of the pump is connected to the extraction outlet of the device. The pump may be operable to pump water from the device, for obtaining a pressure of water being processed by the device that is lower than that of treated water to be supplied to a further treatment stage downstream from the pump. The pump may be operable to pump water from the device for obtaining a pressure of water being processed in the device that is lower than a pressure of sea exerted on the device at depths of up to 3000 meters.

Any of the various aspects of the disclosure may include further features as described in relation to any other aspect, wherever described herein. Features described in one embodiment may be combined in other embodiments. For example, a selected feature from a first embodiment that is compatible with the arrangement in a second embodiment may be employed, e.g. as an additional, alternative or optional feature, e.g. inserted or exchanged for a similar or like feature, in the second embodiment to perform (in the second embodiment) in the same or corresponding manner as it does in the first embodiment.

Various features and potential advantages that may be provided by exemplary embodiments that are disclosed herein are described and will be apparent from the specification throughout.

BRIEF DESCRIPTION OF THE DRAWINGS

There will now be described, by way of example only, exemplary embodiments of the invention, with reference to the accompanying drawings, in which.

DETAILED DESCRIPTION OF THE DISCLOSED EXEMPLARY EMBODIMENTS

Figure 1:
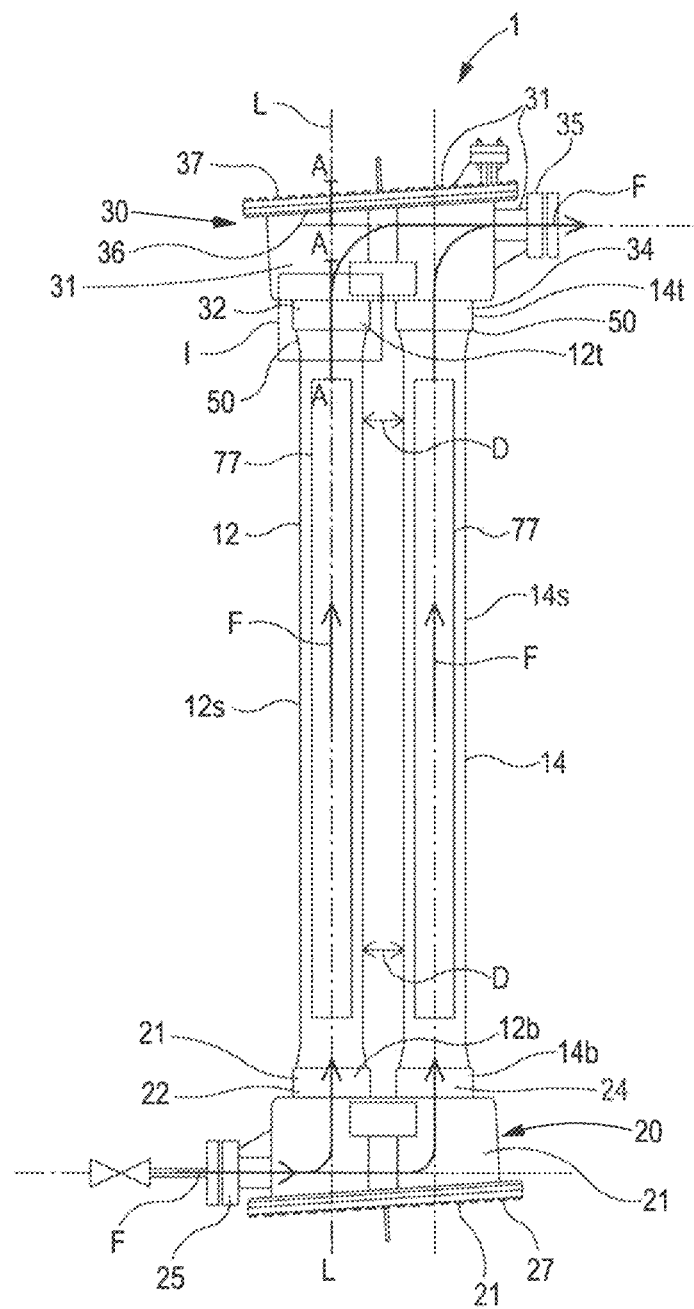
FIG. 1 is a side-on representation of a device for water processing according to an embodiment of the disclosure.

Turning first to consider FIG. 1, a device 1 for use in processing water is generally depicted. The device 1 has two cylindrical housings 12, 14. The housings 12, 14 are spaced apart by a distance D and arranged in parallel relationship.

The device 1 is illustrated in an orientation for operational use, where the cylindrical housings are vertical. In practice, the device 1 may be supported in this orientation in a frame on the seabed, and immersed such that exterior surfaces 12s, 14s of the walls of the housings 12, 14 contact the surrounding seawater. In other variants, the housings 12, 14 could be installed in other orientations, e.g. horizontally.

The cylindrical housings 12, 14 comprise tubulars of equal lengths, and are arranged so that the first, upper ends 12t, 14t of the housings are aligned side-by-side, and the second, lower ends 12b, 14b of the housings are aligned at the same height as each other side-by-side.

Filter membranes 77 such as microfiltration (MF) or ultrafiltration (UF) membranes are contained inside the housings 12, 14. The filter membranes 77 are typically mounted to an interior ring on an inner wall of the housings, so as to facilitate supporting the membranes in operational position. The membranes mounted inside the housings are used for filtration treating water, e.g. seawater. The cylindrical housings 12, 14 isolate the interior, including the membranes 77 from effects of pressure of the seawater environment against the outer surfaces 12s, 14s of the housings.

The device provides in effect a pressure tight unit of casing and/or walling that is formed to provide a connected interior flow space with a flow path for water to be treated to be fed in, treated by the membranes, and extracted from the device.

At the lower end, the device 1 has a distributor chamber 20. The walling and/or casing 21 (i.e. a first section of casing and/or walling) is adapted and formed to produce a structure encompassing the lower ends 12b, 14b of the housings, so as to provide the distributor chamber 20 which allows the water to be treated to be distributed into the two cylindrical housings 12, 14. The ends 12b, 14b of the cylindrical housings 12, 14 are received in sleeves 22, 24 and bonded in place.

At the upper end, the device 1 has a collector chamber 30. The walling or casing 31 (i.e. a second section of casing and/or walling) is adapted and formed to obtain a structure that encompasses the upper ends 12t, 14t of the housings, so as to obtain the collector chamber 30 which allows the treated water from the housings 12, 14 to be collected and merged together. In this regard, the ends 12t, 14t are received in corresponding sleeves 32, 34 and bonded in place to obtain a bonded joints 50 using suitable bonding material between the surfaces of the sleeves and an outer surface of the walls of the housings 12, 14. The distributor chamber 20 reaches across the first ends and the collector chamber 30 reaches across the second ends of the cylindrical housings 12, 14.

As indicated by arrows F, the device 1 provides in its interior a flow path by which seawater is fed through the device and treated. Seawater enters the distributor chamber 20 in a common flow, and is distributed between the cylindrical casings 12, 14. The seawater passes through the cylindrical housings and is treated by the membranes. The treated seawater then enters into the collector chamber 30 where the treated seawater is collected and merged together into flow of treated water which is extracted.

In more detail now, it can thus be seen in FIG. 1 that the device includes a feed inlet 25 into which the seawater to be treated enters into the distributor chamber 20. The water to be treated flows into the distributor chamber 20 and into the lower ends 12b, 14b of the housings 12, 14. The feed inlet 25 is arranged to direct water radially into the distributor chamber 20 with respect to the longitudinal axes L of the cylindrical housings 12, 14. The bottom ends 12b, 14b of the housings 12, 14 define entrances to the interiors of the cylindrical casings 12, 14. It can be appreciated that the entrances to the interiors of the cylindrical housings are spaced apart at different distances away from the feed inlet 25, and the seawater is supplied and distributed into the entrances into the respective cylindrical housings 12, 14 where part of the water is processed separately in one housing 12 and another part of the supplied water is processed separately by the membranes in the other housing 14. The feed inlet 25 is disposed in a part of the walling and/or casing 21 where it is offset radially away from the housings 12 with respect to the axes L.

The device 1 also has an extraction outlet 35 from which water that has been treated is removed from the collector chamber 30 through the extraction outlet 35. The treated water arrives in the interior of the collector chamber 30 from the upper ends 12t, 14t of the casings. The extraction outlet 35 is arranged to direct the treated water in direction radially with respect to the axes L. The upper ends 12t, 14t of the casings define exits from the interiors of the cylindrical housings 12, 14. The exits from the interiors of the cylindrical housings are spaced apart at different distances from the extraction outlet 35, so that the treated fluid is drawn laterally through the chamber 30 from both far and near exits toward the extraction outlet 35. The extraction inlet 35 is disposed in a part of the walling and/or casing 31 where it is radially offset away from the housings 12, 14 with respect to the axes L.

It can be noted that the collector chamber 30 has casing and/or walling 31 which extends in a direction along the axes L beyond the upper ends of the cylindrical housings 12, 14 to create chamber 30 which is spacious and can give favourable flow characteristics such as to minimise pressure drop effects and maximise distribution effectiveness amongst housings 12, 14. Indeed preferably, the interiors of the housings 12, 14 and the interiors of the collector chamber 30 and distributor chamber 20 do not impose any restrictions to the flow through of seawater aside from the necessary effects of the membranes. The configuration of the distributor chamber 20 is similar. With casing and/or walling 21 extending in the direction along the axes L beyond lower ends of the cylindrical housings 12, 14.

The walling and/or casing 31 defining the collection chamber 30 also includes a removable lid 37 which is secured in place against a circumferential lip 36 of the walling. The lid 37 is sealably fastened, e.g. screwed into part of the walling and/or casing 31. A gasket or other, e.g. elastomer seal is provided on the lid 27 or lip 36 to obtain the seal when the lid is 37 fastened and the device is in use. The lid 37 is removable, e.g. by unscrewing, to allow direct vertical axial access to the interior of the casings 12, 14 through an interior region of the collector chamber 30, e.g. for servicing or replacement of membranes at the due time. Thus, membranes and supporting rings and/or fastening brackets may be readily pulled out from or inserted their location in the interiors of housings 12, 14. The bonded joint 50, arrangement of the ends 12t, 14t, the casing and/or walling 31, and the chamber 30, allow open access through the lid 37 to the full internal diameter of the walls of the housings 12, 14 is provided. The interiors of the device are free from restrictions in the region above the location of the housings and the ends 12t, 14t of the housings 12, 14. This not only may facilitate replacement, but may also provide an open flow path.

The lower, distributor chamber 20 is arranged similarly, where the walling and/or casing 21 includes a removable lid 27, allowing access in the same way as for the collector chamber 30 except from the other ends of the housings 12, 14.

It may also be noted that the distributor chamber 20 is tapered in depth extent away from the feed inlet 25. Conversely, the collection chamber 30 is tapered away from the extraction outlet 35. The tapers can facilitate channelling water through the device 1.

Figure 2:
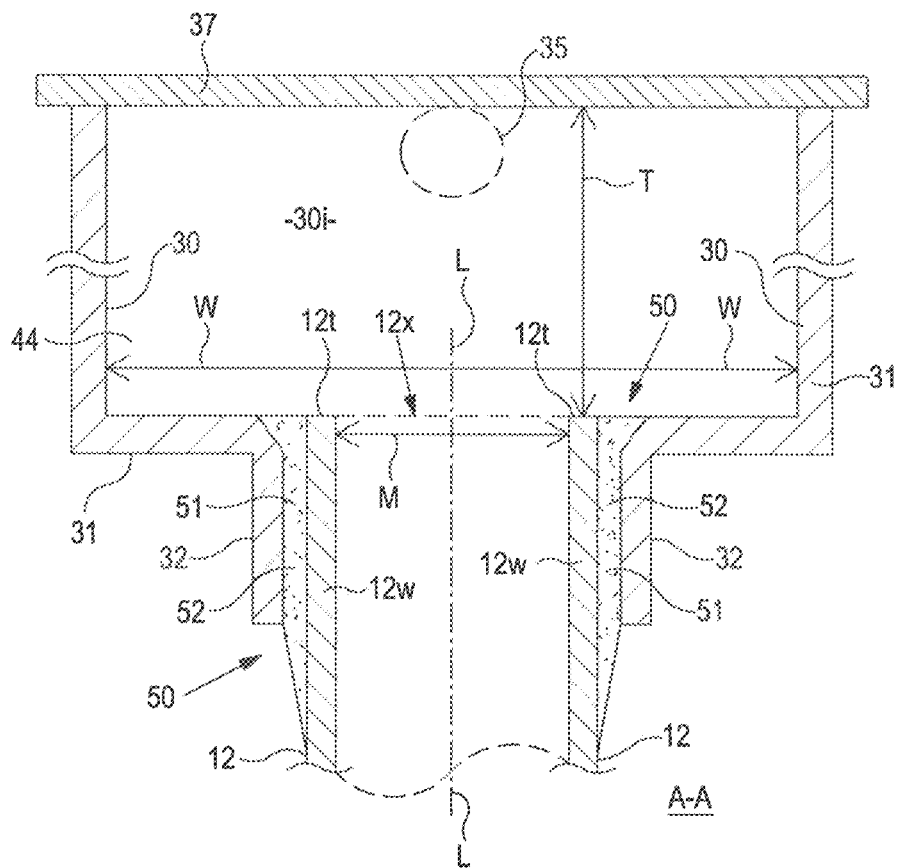
FIG. 2 is a sectional representation on line AA in the inset frame I of FIG. 1, in larger and exaggerated non-uniform scale.

In FIG. 2, part of the structure encompassing the ends 12t, 14t of the cylindrical sections is illustrated. It depicts in particular the bonded joint 50 between the upper end 12t of the housing 12 and the sleeve 32. FIG. 2 gives a schematic representation of the relationships and are not to scale, and the scale also does not correspond with that of FIG. 1.

The housing 12 has an opening 12x from the interior of the casing 12 through which treated water passes into the collection chamber 30 in use. Flow of treated water is contained at the end of the housing by the full internal diameter M of the space between wall portions of the cylindrical housing 12. The space for the flow of treated water exiting the housing 12 is unrestricted. Typically, the diameter M and indicated cross section of the housing is substantially constant the entire top-to-bottom length of the housing 12.

Any of and/or preferably each of the housings 12 is fluidly connected to the collector chamber 30 substantially as depicted in FIG. 2. The interior space 30i of the collector chamber 30 provides a channel 44 for flow of the treated water toward the extraction outlet. The width W of the channel 44 is greater than the diameter M of interior of the tubular housing for flow therealong. The interior extends beyond the end 12t of the housings 12 by depth extent T, which also is greater than the diameter M for flow in the interior of the tubular housings 12.

The housing 12 defines an opening 12x which is in effect also an opening of or in the chamber 30 through which the fluid passes into the chamber.

The converse arrangement is applicable for the distributor chamber 20 where any or preferably each of the housings 12, 14 are connected at their bottom ends to the distributor chamber 20 in the same manner as indicated in FIG. 2.

The collar 32 in this example is an integrated formation of the walling and/or casing 31 of the chamber 30. The upper portion of the wall 12w is received in the collar. The collar 32 provides a 360 degree circumferential wall around the outside of the cylindrical casing 12. Bonding material 51 is disposed in an annular region 52 between the collar 32 and an outer surface of the wall 12w of the casing, and forms a fluid tight, e.g. water tight, bond between the surface of the casing 12 and the sleeve. The join 50 is also pressure tight so that the pathway for treated water into the chamber 30 through the joined section is isolated from seawater pressure due to seawater contacting the exterior of the join when immersed.

The bonding material 51 is selected to be compatible with the material of the sleeve 32 and that of the housing 12. Typically, the materials of the sleeve 32 and the housing 12 are the same, but not necessarily so. For purposes of this example, the material of the housing 12 and sleeve 32 subjected to the bonding material is glass reinforced epoxy (GRE) or glass reinforced plastics (GRP) or similar, and the bonding material is a resin that is compatible, e.g. epoxy resin. In order to form the bond 50, the end of the tubular cylindrical housing 12 is arranged in the sleeve 12 and epoxy resin is poured into the annular region 52 and left to set.

Figure 3:
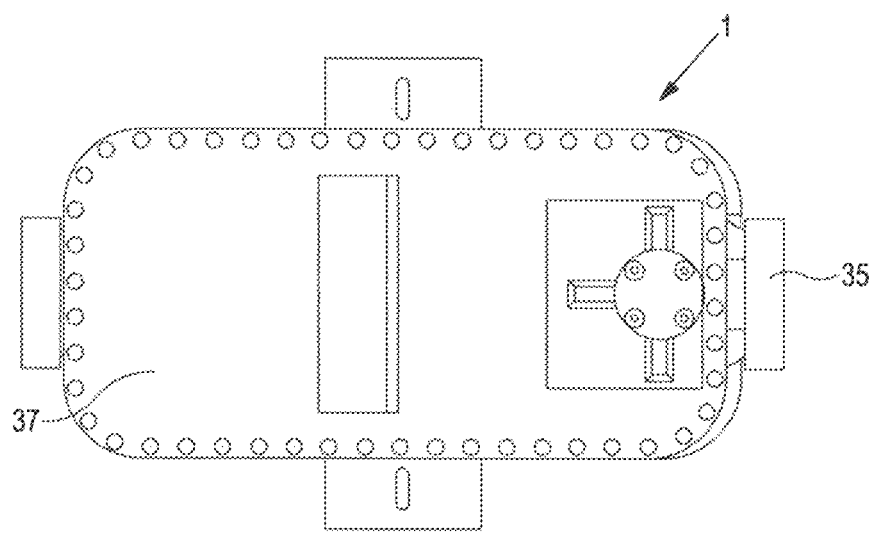
FIG. 3 is a top view representation of the device of FIG. 1.

FIG. 3 illustrates the lid 37 in closer detail. The lid is in the form of a covering plate that reaches across the ends of both cylindrical sections. The lid 37 fits onto a circumferential lip and allows functionality as described above.

Figure 4:
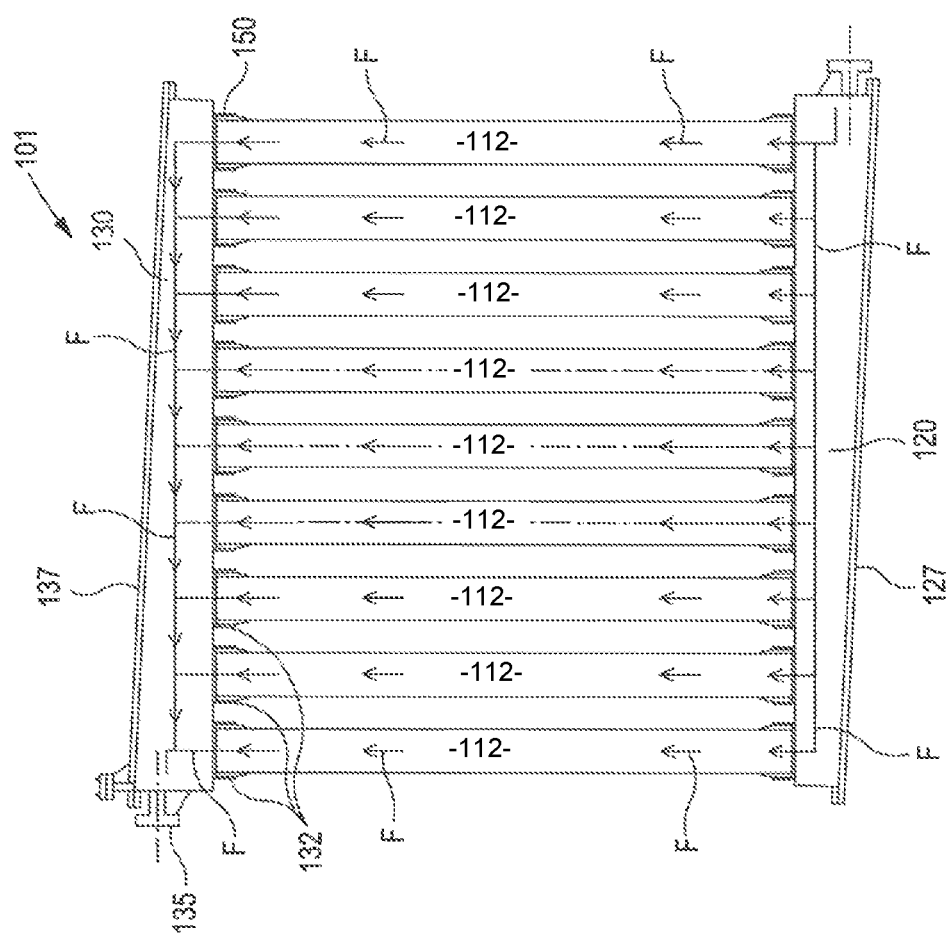
FIG. 4 is a side-on, part sectional representation of a device for water processing according to another embodiment of the disclosure.

In FIG. 4, a device 101 for water processing is depicted in another example. The device 101 functions similarly to that of FIGS. 1 to 3. However, this device 101 has nine cylindrical housings 112 mounted in parallel, each of which houses filter membranes for treating water. Thus, water is treated separately in separate housings 112. The housings 112 are individually bonded at the upper ends to a first section of casings and/or walling providing a collection chamber 130, and at the lower ends to another, second section of casings and/or walling providing a distributor chamber 120. The walling and/or casing at the top end is fitted with a lid 137, and has collars 132 in which upper ends of the cylindrical housings 112 are received and bonded. Treated water exits from the housings 112 and enters the combined region of the chamber 130, and exits laterally through an extraction outlet 135. Water to be treated enters through inlet 125 into the distributor chamber 120 and is distributed into the housings 112 and is treated by the filter membranes, e.g. by microfiltration. Since a greater number of cylindrical casings are available for the membranes, the amount of fluid that can be treated can be increased in the device of 101 compared with that of the device 1. The flow paths for water through the device 101 is marked by arrows F.

Figure 5:
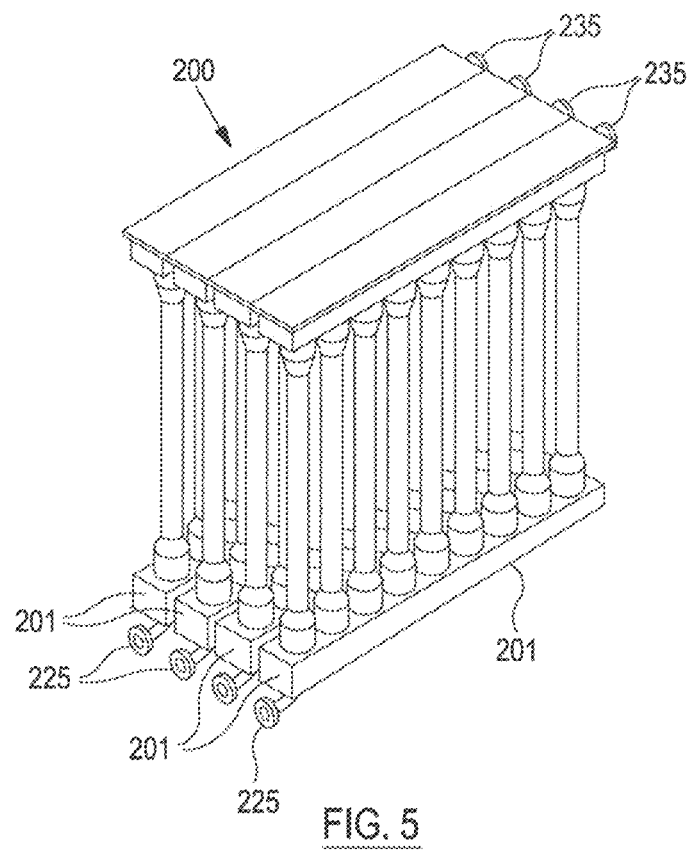
FIG. 5 is a perspective representation of a bank of water processing devices according to another embodiment.
Figure 8:
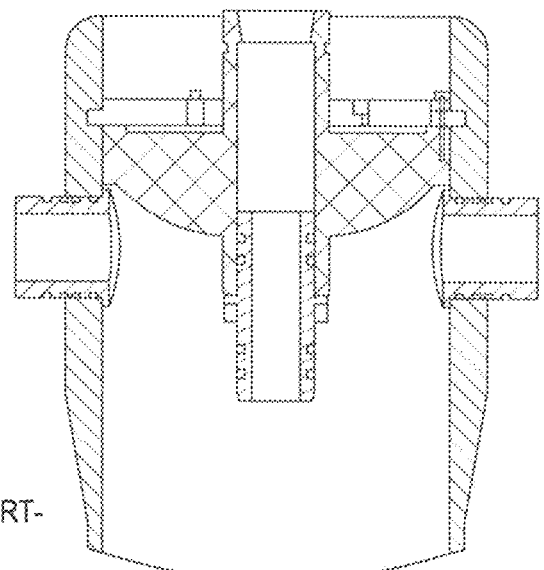
FIG. 8 is a prior art representation of an end portion of a membrane casing.

With reference to FIG. 5, a bank 200 of devices 201 for water processing can be used for treating still greater volumes of seawater. Each device 201 in FIG. 5 is similar to that shown in FIG. 3, except that the feed inlets are arranged differently to supply water through an underside. The feed inlets 225 may be connected together to a common supply of seawater. The extraction outlets 235 may be connected together to a common extraction pipe, and a pump can be operated downstream from the outlets 235 to help to draw the seawater through the bank of devices 201 in use.

Figure 6:
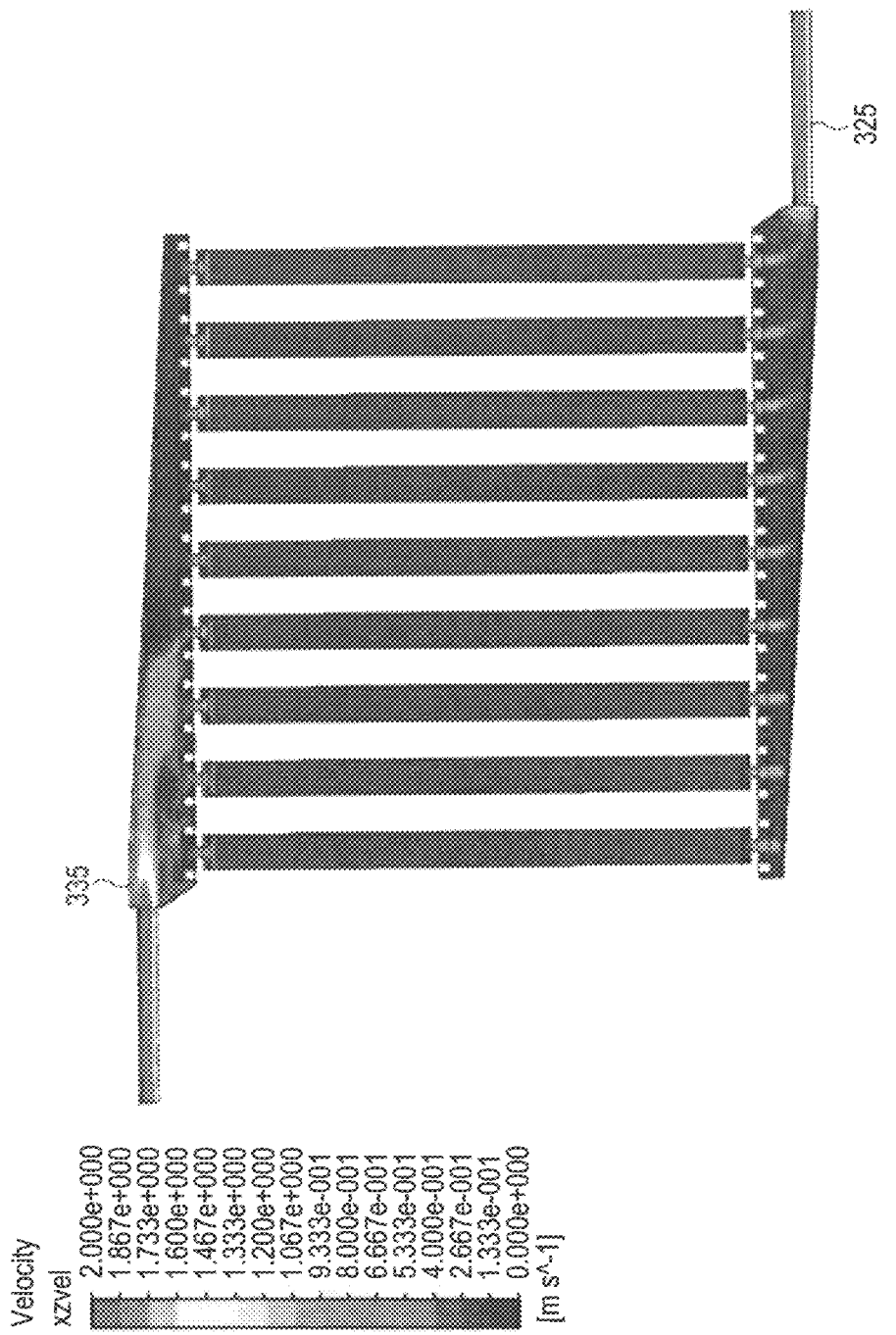
FIG. 6 is a contour plot of flow velocity from flow modelling results based on the device of FIG. 4.

In FIG. 6, results from modelling provides a map of the flow rate of water fed through the casings from the feed inlet 325 to the extraction outlet 335 in an nine housing device such as the devices 101 or 201 of FIG. 4 or 5.

Figure 7:
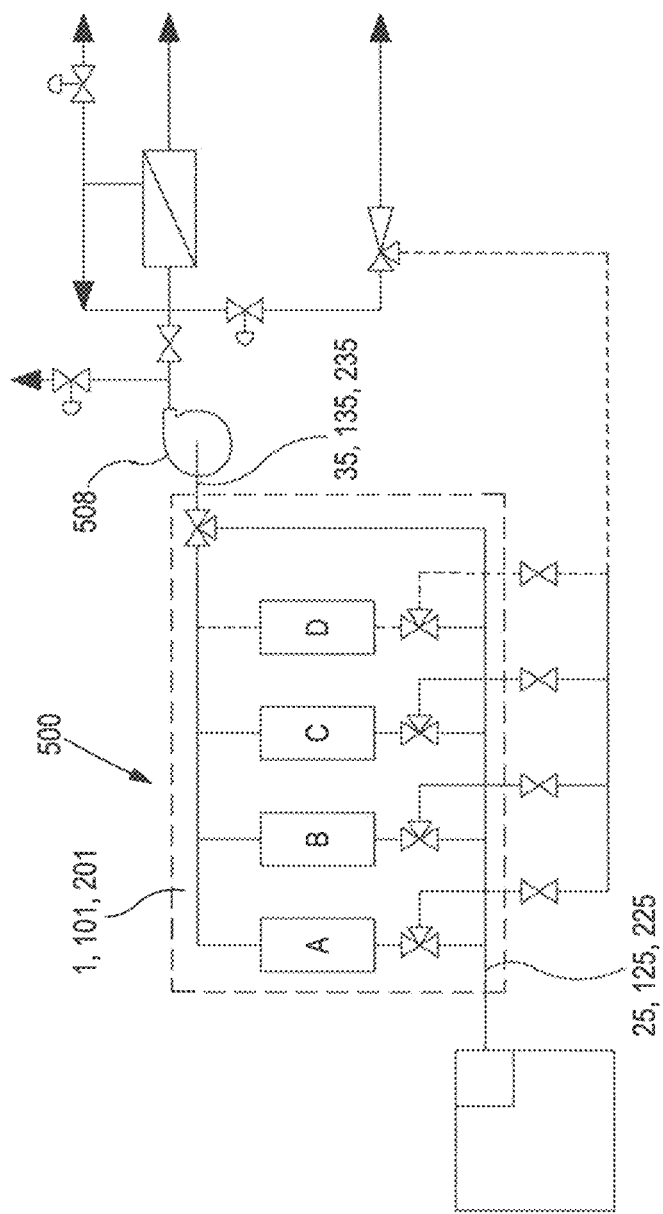
FIG. 7 is a schematic diagram of a system for processing water at the seabed in which devices for water processing may be employed.

In FIG. 7, an example system 500 for processing seawater and performing water treatment for producing water for injection into a wellbore. The device 1, 101, 201 can be used to implement the parallel feedthrough filtering as indicated by filters A,B,C,D. Filters A, B, C and D may be implemented in one device, by filter membranes in respective separate housing sections fluidly connected to the collector chamber and distributor chambers such as in the devices described above. Thus, one housing section of the device may provide filter A, the next housing section filter B, etc. The membranes may be ultra filtration or micro filtration membranes, so as to apply the same processing to water streams in parallel. Operating the system 500 includes using the pump 508 which is connected on its suction side to the extraction outlet 35, 135, 235 to facilitate drawing seawater through the devices 1, 101, 201. Raw/untreated seawater is fed into the feed inlet, into the distributor chamber where disinfection or electrolytic treatment is conducted and then into the respective housings for filtering. The feed inlet is typically an open inlet open to water, with no pump placed upstream of the feed inlet. The pressure of water treated in the device on the suction side of the pump 508 is lower than of the ambient seawater at or near the seabed, e.g. pressure of the sea exerted on the exterior of the device 1, 101, 201. Downstream processing of the seawater takes place at "positive pressure differentials" and may include a defusion process for the purpose of removing dissolved (ionic/molecular) materials, where the filtered water from the device is driven through by the pump.

In the processing of water at the seabed, it can be appreciated that embodiments disclosed herein are directed to overcoming challenges where the conventional approach for connecting the membrane elements involves multiple connection points, each requiring compliance to high tolerance and certification levels. In high throughput applications, the challenges associated with the conventional connection technique can be exacerbated, as simply adding elements to cope with demand can be associated with further fittings and connections. Yet further, it can be noted that fluid supplied through individual branches pipes can restrict flow and place requirements for further elements even higher.

The injected water may be injected through the wellbore into a subsurface formation for example to stimulate the recovery of oil and gas from the formation. The water may also need to be of a particular quality to avoid potential difficulties when introducing it to the wellbore. This may be to avoid effects of deposits, corrosion, wear or the like on equipment of the wellbore.

Various modifications and improvements may be made without departing from the scope of the invention as defined by the claims below and their equivalents. Although bonded joints are utilised in various examples, and can be an efficient and convenient manner of construction, it may be appreciated that the device may also be embodied by a "one-piece" casing and/or walling that has a similar form to that illustrated in the various figures but which avoids bonded joints or connections altogether. Although the use of the device is described in the above with reference to the drawings as taking place subsea, it may in other variants be installed topsides instead, e.g. on a platform or rig, and used in a topsides water processing system, e.g. on the platform or rig.

The invention claimed is:

1. A device for subsea water processing, the device comprising:
   a plurality of tubular housing sections for housing filter membranes for treating water by filtration in the interiors of the tubular housing sections, wherein the interiors of the housing sections are separate from one another and the housing sections each have a first end and a second end;
   a feed inlet for supplying the device with water to be treated;
   an extraction outlet for extracting treated water from the device;
   a distributor chamber configured for containing a flow of the water to be treated from the feed inlet and distributing the water to be treated into the interiors of the housing sections through the first ends of housing sections, wherein the first ends of the housing sections are each connected to the distributor chamber by annular joints formed on the outsides of the respective housing sections at or near the first ends of the housing sections;
   a collector chamber connected to the second ends of the housing sections, wherein the collector chamber is configured for collecting the treated water from the interiors of the housing sections through the second ends of the housing sections and communicating a merged flow of the treated water to the extraction outlet; and
   a water treatment flowpath that extends from the feed inlet into the distributor chamber, through the distributor chamber and into the interiors of the housing sections through the first ends of the housing sections, through the interiors of the housing sections and into the collector chamber through the second ends of the housing sections, and from the collector chamber to the extraction outlet, wherein the water treatment flowpath is configured to transport at least some of the flow of the water to be treated from the feed inlet to the extraction outlet as treated water.

2. A device as claimed in claim 1, wherein the housing sections comprise tubular sections, wherein ends of the tubular sections comprise openings through which treated water can pass from the interiors of the tubular housing sections into the collector chamber.

3. A device as claimed in claim 1, further comprising at least one filter membrane in the interior of each housing section.

4. A device as claimed in claim 3, wherein the filter membranes are ultrafiltration membranes or microfiltration membranes.

5. A device as claimed in claim 1, wherein the second ends of the housing sections are each connected to the collector chamber by bonded joints exterior to the interiors of the housing sections.

6. A device as claimed in claim 5, wherein each of the bonded joints comprises a resin bond.

7. A device as claimed in claim 1, further comprising a cover which is removable for accessing at least one of the housing sections through an interior of the distributor chamber or an interior of the collector chamber.

8. A device as claimed in claim 1, wherein the extraction outlet is arranged to extract the treated fluid from the collector chamber in a radial direction with respect to a longitudinal axis of the housing sections.

9. A device as claimed in claim 1, wherein the feed inlet is arranged to enter the water to be treated into the distributor chamber in a radial direction with respect to a longitudinal axis of the housing sections.

10. A device as claimed in claim 8, wherein either or both of the feed inlet and extraction outlet are arranged in a section of walling or casing radially offset from the housing sections.

11. A device as claimed in claim 1, wherein the distributor chamber has a cross-sectional extent which tapers away from the feed inlet.

12. A device as claimed in claim 1, wherein the collector chamber has a cross-sectional extent which tapers away from the extraction outlet.

13. A device as claimed in claim 1, wherein the housing sections are arranged in parallel and a spaced apart relationship.

14. A device as claimed in claim 13, wherein the distributor chamber extends across the first ends of each of the housing sections.

15. A device as claimed in claim 14, further comprising at least one sleeve adapted to fit around an outer diameter of at least one of the housing sections, wherein a portion of the at least one of the housing sections is received in the sleeve and bonded thereto.

16. A device as claimed in claim 13, wherein the collector chamber extends across the second ends of each of the housing sections.

17. A device as claimed in claim 15, wherein second ends of the housing sections are connected to the collector chamber by annular joints formed on the outsides of the housing sections.

18. A device as claimed in claim 16, further comprising at least one sleeve adapted to fit around an outer diameter of at least one of the housing sections, and wherein a portion of the at least one of the housing sections is received in the sleeve and bonded thereto.

19. A device as claimed in claim 1, wherein an entire inner diameter of at least a portion of each of the housing sections is in fluid communication with the feed inlet.

20. A device as claimed in claim 1, wherein an entire inner diameter of at least a portion of each of the housing sections is in fluid communication with the extraction outlet.

21. A system for treating seawater subsea, the system comprising:
a device as claimed in claim 1;
a pump wherein the suction side of the pump is connected to the extraction outlet of the device.

22. A system as claimed in claim 21 wherein the pump is configured to pump water from the device, and for obtaining a pressure of water being processed by the device that is lower than that of treated water to be supplied to a further treatment stage downstream from the pump.

23. A system as claimed in claim 21, wherein the pump is configured to pump water from the device for obtaining a pressure of water being processed in the device that is lower than a pressure of sea exerted on the device at depths up to 300 meters.

24. A device for subsea water processing, the device comprising:
a plurality of tubular housing sections for housing filter membranes for treating water by filtration in the interiors of the tubular housing sections, wherein the interiors of the housing sections are separate from one another and the housing sections each have a first end and a second end;
a feed inlet for supplying the device with water to be treated;
an extraction outlet for extracting treated water from the device;
a distributor chamber having an interior configured for containing a flow of the water to be treated from the feed inlet and distributing the water to be treated into the interiors of the housing sections through the first ends of housing sections, wherein the first end of each housing section forms a first opening defined by an inner diameter of the first end that is entirely open and exposed to the interior of the distributor chamber; and
a collector chamber having an interior configured for collecting the treated water from the interiors of the housing sections through the second ends of the housing sections and communicating a merged flow of the treated water to the extraction outlet, wherein the second end of each housing section forms a second opening defined by an inner diameter of the second end that is entirely open and exposed to the interior of the collector chamber.

25. A device as claimed in claim 24, wherein the first ends of the housing sections are each connected to the distribution chamber by bonded joints that are pressure tight barriers between the distribution chamber and the housing sections against communication of pressure into the distributor chamber from outside the respective housing sections.

* * * * *